United States Patent [19]

Lee

[11] Patent Number: 5,179,586
[45] Date of Patent: Jan. 12, 1993

[54] LINE INTERFACE CIRCUIT

[75] Inventor: Michael C. G. Lee, Ottawa, Canada

[73] Assignee: Northern Telecom Limited, Montreal, Canada

[21] Appl. No.: 668,613

[22] Filed: Mar. 13, 1991

[51] Int. Cl.[5] .................. H04M 11/00; H04M 1/00
[52] U.S. Cl. .................................. 379/93; 379/442; 307/475; 375/76
[58] Field of Search ............... 379/90, 93, 94, 96–99, 379/441–444; 307/264, 261, 243, 263, 475; 328/104, 154; 375/7, 8, 36, 76

[56] References Cited

U.S. PATENT DOCUMENTS 4,339,727 7/1982 Kage et al. .................... 307/261
4,947,406 8/1990 Yokoyama .................... 307/475

OTHER PUBLICATIONS

Telesis, vol. 16, No. 2, published by Bell-Northern Limited in 1989, Cover page and pp. 5 through 29.

Primary Examiner—James L. Dwyer
Assistant Examiner—Wing Chan
Attorney, Agent, or Firm—Smart & Biggar

[57] ABSTRACT

An interface unit for interconnecting a telephone central switch to a personal computer. The interface unit receives power and data from the switch over a two wire twisted pair. The data is in a half duplex T.C.M. format and is transformed into standard digital data with the logic "1" and "0" being represented by +5V and 0V respectively. The standard digital data is then arranged into 8 bit words and encoded in either an asynchronous or synchronous manner depending on the type of computer. The interface unit has a line interface circuit which provides the physical interface between the interface unit and the computer. The interface unit has a transmitter circuit which converts the +5V and 0V digital signals to −5V and +5V, respectively. These values are recognized by the computer as logic "1" and "0". The interface unit also has a receive circuit which takes the computer output signals (between −5 and −12V for logic "1" and between +5 and +12V for logic "0") and converts them back into standard digital format.

9 Claims, 6 Drawing Sheets

LINE INTERFACE CIRCUIT

FIELD OF THE INVENTION

The invention is in the field of telephony communications and particularly relates to a telephone line powered interface between a digital signals telephone line and a computer communications line.

BACKGROUND OF THE INVENTION

Various practices of using telephone facilities as a means of providing communications links for digital signal devices such as digital telephones, telemeter apparatus, digital computers and the like, are well known. Digital telephone facilities of the time division multiplex (TDM) type have been utilized to advantage to provide usable bandwidth of up to 64 Kb/s for example, for computer communications. Of course appropriate interface devices are required to transfer control and data signals between the operating formats of the telephone line of the telephone system and a communications port of the computer. One class of computers generally referred to as Personal Computers (PC) is exemplary, as such computers are often in an isolated situation where the only practical means of electronic communications is via a telephone connection. Some manufacturers of personal computers have made general provision for unforseen requirements by providing connection locations for additional circuit devices as and when required. In such an instant an appropriate telephone line interface circuit may reside in such a location and advantageously make use of support facilities already resident in the computer, such as power supplies for example. As the purpose of the telephone line is that of communicating at a distance from the telephone facility it is only natural the interface with the port of the computer be provided closely adjacent the computer and preferable by circuit means installed within the computer for this purpose. However in some instances the provided space may already be occupied or there may never have been any space provided in a particular module of PC. In such instances the interface device must reside independently of the computer and be connected thereto by a typical standardized computer communications port. Such ports are usually operable in one of several well known standards, RS-232, RS-422 and RS-423 for example. Furthermore such ports are not usually adapted to operating over distances similar to those distances over which typical telephone lines are usually operative. The telephone line may be operable in the standard analog format, the integrated services digital network format (ISDN), or in any of several proprietary formats. In any case the interface device is unlikely to have access to the computer as a source of operating power and therefor some other provision for operating power is required.

One example of an interface device is discussed in the U.S. Pat. No. 4,381,427 issued on Apr. 26, 1983 to W. E. Cheal et al. and titled "Subscriber Loop System for voice and data". In this patent, the interface device requires more operating current than is available to it via the telephone line. In order that a local utility power failure be of no consequence to the normal operation of the telephone system, a relay switchover feature is provided so that at least plain ordinary telephone service (POTS) may continue in spite of such power failure. In most modern telephone systems all seems well checks as to the operability of lines and telephone apparatus periodically occur. In Cheal et al's arrangement, a local power failure is prevented from disrupting the normal all seems well maintenance checks to the operating advantage of the telephone switch. Presently personal computers are usually adapted such that data calls may be originated or answered for example, via the computer key board, and hence the telephone apparatus as provided by Cheal is not essential.

Examples of commercially available integrated circuit devices used to provide this type of interface are Motorola MC1488, MC1489, 26LS31 and 26LS32. These devices obtain their operating power from the control switch of the telephone switching system. Recently, however, telephone switching systems, such as the Norstar system developed by Northern Telecom, have been proposed in which the current which is available to the remote device is too low to run such commercially available device. The Norstar system is described in TELESIS, Volume 16, Number 2, published by Bell-Northern Research Ltd. in 1989. The disclosure of that magazine is incorporated herein by reference. On the other hand, some commercial interface devices are available which operate with sufficient low current consumption but they can only operate at up to 20 Kbits/sec, which is much less than the 450 Kbits/sec required by some industry designs.

It is an object of the invention to provide an interface device which is remote from an associated telephone facility and which is independent of any local powering source such as a utility powered supply for its operation.

More specifically, it is an object of the invention to provide a telephone line powered interface device which couples information signals between a serial digital signal format of the telephone line and any of a plurality of standard port operating formats of a personal computer.

SUMMARY OF THE INVENTION

According to one broad aspect, the invention provides an interface circuit for converting first digital data in which binary "1"s and "0"s are defined by first and second voltage levels respectively into a data signal in which the binary "1"s and "0"s are defined by third and fourth voltage levels, respectively, the interface circuit comprising a first current source deriving a voltage at the third voltage level and a second current source deriving a voltage source at the fourth voltage level and means for connecting the first current source to an output when the digital data is at the first voltage level and for connecting the second current source to the output when the digital data is at the second voltage level.

In another aspect, the invention provides an interface circuit for converting first digital data in which binary "1"s are defined by a first voltage ranging between a first two levels and binary "0"s are defined by a second voltage ranging between a second two levels into a data signal in which the binary "1"s and "0"s are defined by third and fourth voltage levels, the interface circuit comprising a level translator and inverter for setting an output voltage to the third voltage level when the incoming voltage is between the first two levels and for setting the output voltage to the fourth voltage level when the incoming voltage is between the second two levels.

According to yet another aspect. the invention provides an interface circuit for connecting a telephone interface unit in which digital data represented by +5 V for logic "1" and OV for logic "0" is present to a personal computer in which logic "1" is represented by at least −5 V and logic "0" is represented by at least +5 V, the interface unit comprising a transmitter circuit having a first current source connected to +5 V and a second current source connected to −5 V and means for connecting the first current source to the computer when the digital data is OV and connecting the second current source to the comparator when the digital data is +5 V, the interface unit comprising a receiver circuit for producing an output voltage of +5 V when data received from the personal computer is at least −5 V and for producing an output voltage of OV when data received from the personal computer is at least +5 V.

DESCRIPTION OF A PREFERRED EMBODIMENT

Figure 1:
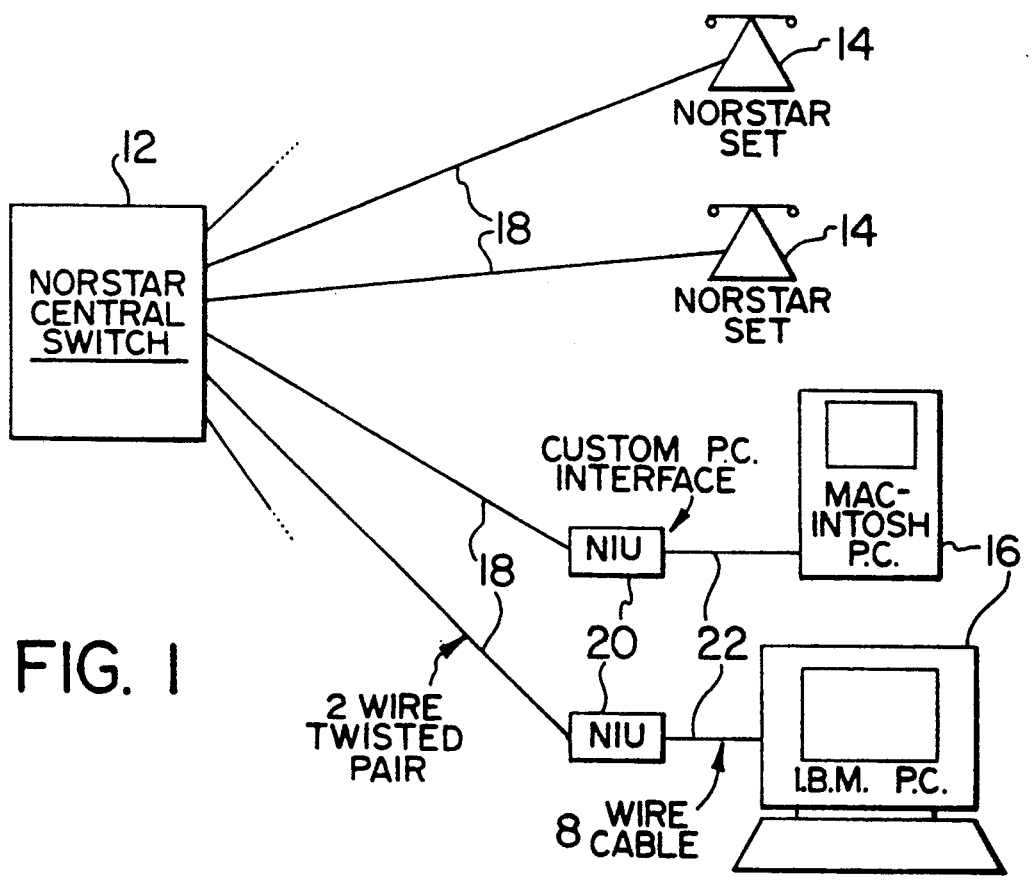
FIG. 1 is a block diagram showing a telephone switching system in which telephone sets and personal computers are connected to a central switch.

A Norstar system 10, shown in FIG. 1, comprises a Norstar central switch 12 connected to Norstar telephone sets 14 and to personal computers 16. The link between each set 14 and the central switch 12 is a two wire twisted pair line 18. However, in the case of each P.C. 16, the link includes, in addition to a two wire twisted pair 18, an interface unit 20 connected to the central switch by the twisted pair 18 and connected to the P.C. 16 by means of an 8 wire cable 22.

Figure 2:
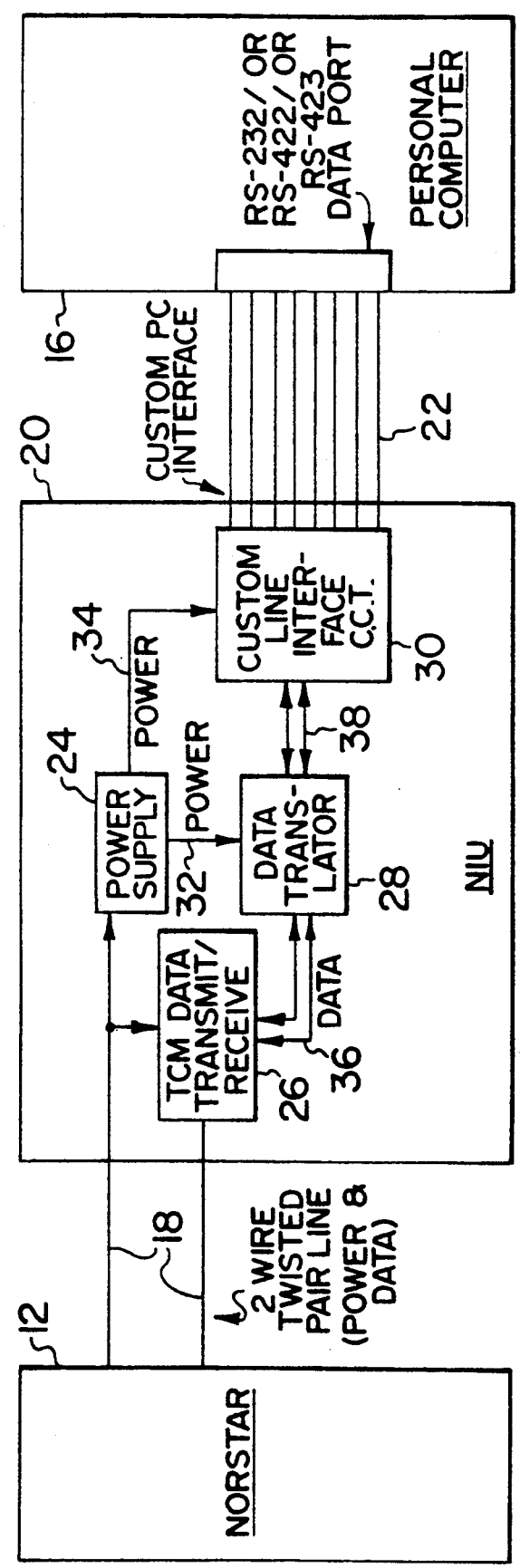
FIG. 2 is a block diagram of one of the interface units shown in FIG. 1 and illustrating the interconnection of the interface unit between the central switch and a personal computer.

Referring now to FIG. 2, which shows one of the interface units 20 in greater detail, the interface unit 20 comprises a power supply 24, a TCM data transmit/receive block 26, a data translator 28 and a custom line interface circuit 30. The interface unit 20 is, as indicated above, connected to the central switch 12 by a two wire twisted pair which carries both power and data.

Figure 6:
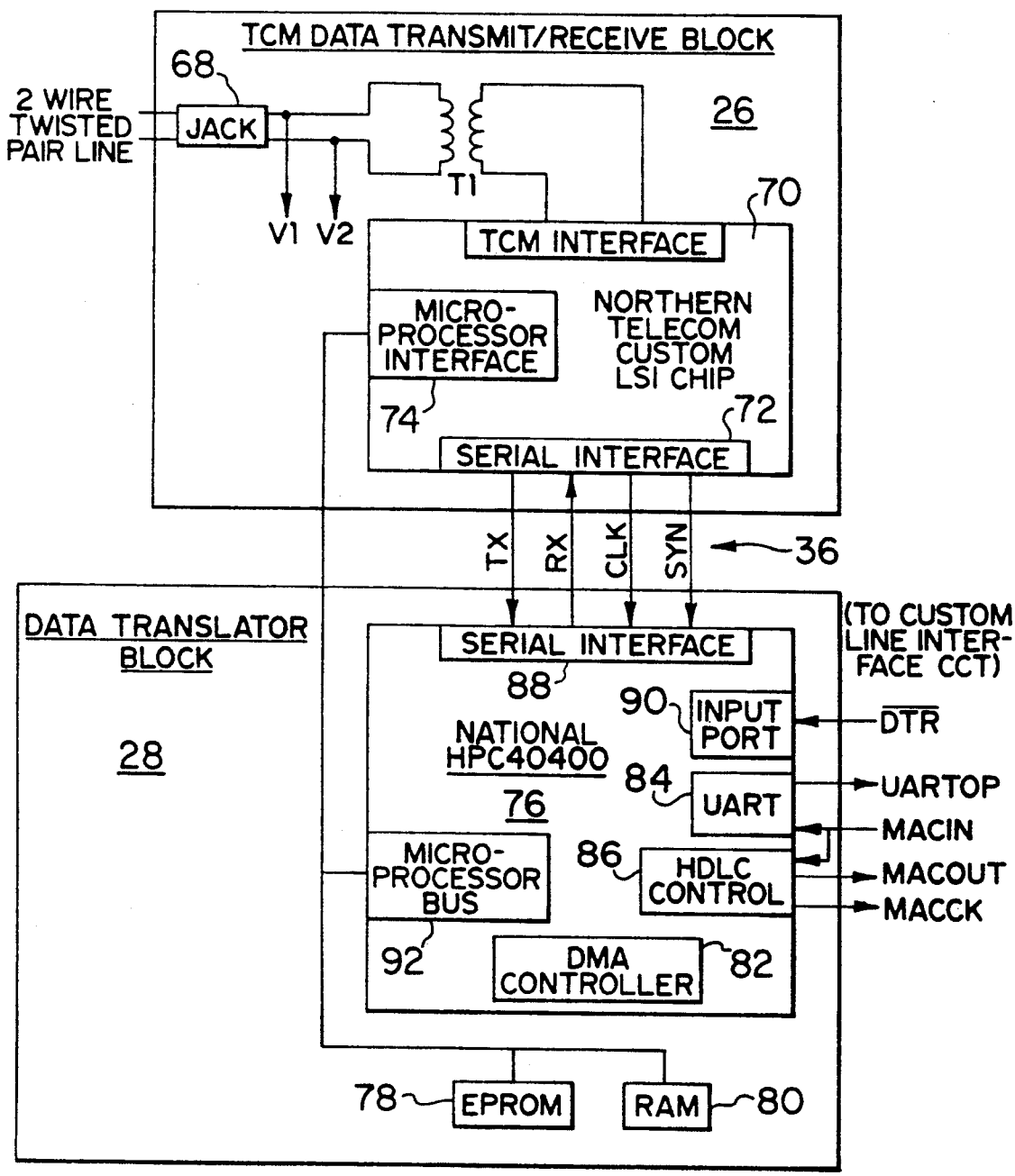
FIG. 6 is a block diagram illustrating in greater detail a data transmit/receive block and a data translator block forming part of the circuitry of FIG. 2.

The power supply 24, described in greater detail hereinafter with reference to FIG. 6, receives power from the Norstar central switch 12 over the associated two wire twisted pair 18 and converts this into a form suitable for the data translator 28 and the custom line interface 30. More particularly, the power supplied from the central switch 12 is approximately 19 volts DC and this is converted by the power supply 24 to +5 volts DC and −5 volts DC for powering the data translator and custom line interface circuits over lines 32 and 34, respectively.

The TCM data transmit/receive block 26 receives from and transmits data to the central switch 12. the data being in the form of time compression multiplexed (TCM) data. This is a proprietary data format of Northern Telecom and is characterized by high speed half duplex data transmission. In this type of data transfer. known as "ping pong", the data travels in only one direction at a time but the direction is rapidly alternated so that data transfer is accomplished in both directions. In the TCM data transmit/receive block 26 the TCM data is converted into standard digital data (+5 V representing a logic "1" and OV representing a logic "0"). Of course, in the reverse direction standard digital data is converted into TCM data for transmission along wire pair 18 to the central switch 12.

The data translator 28 is connected to the TCM data transmit/receive block 26 via a data link 36 along which the standard digital data passes and to the custom line interface circuit 30 via a data link 38. The data translator 28 converts the standard digital data into a form which is acceptable to personal computers. The data is then arranged into words of 8 bits in length (or 1 byte in lengthe and is encoded in such a way that the personal computer can accept it. The data is encoded in either an asynchronous manner or a synchronous manner depending on the operating mode of the interface unit 20. The asynchronous mode is the standard "universal asynchronous receive/transmit" or UART mode which most personal computers accept. The synchronous mode is a clocked format where the data is synchronized to an edge of a clock signal.

The custom line interface circuit 30 provides the physical interface between the interface unit 20 and the personal computer 16. It consists of two separate types of circuit: a receiver circuit and a transmitter circuit. The transmitter circuit converts the standard digital data from the data translator 28 into data voltage levels required by the personal computer. The receiver circuit converts the data voltage levels coming from the personal computer into standard digital data required by the data translator 28.

Specifically, the transmitter circuit converts the standard digital data (+5 V for a logic "1" and 0 V for a logic "0") from the data translator 28 to −5 V for a logic "1" and +5 V for a logic "0". The receiver circuit converts data coming from the personal computer which is between −5 V and −12 V for a logic "1" and between +5 V and +12 V for a logic "0" into the standard digital data.

Figure 3:
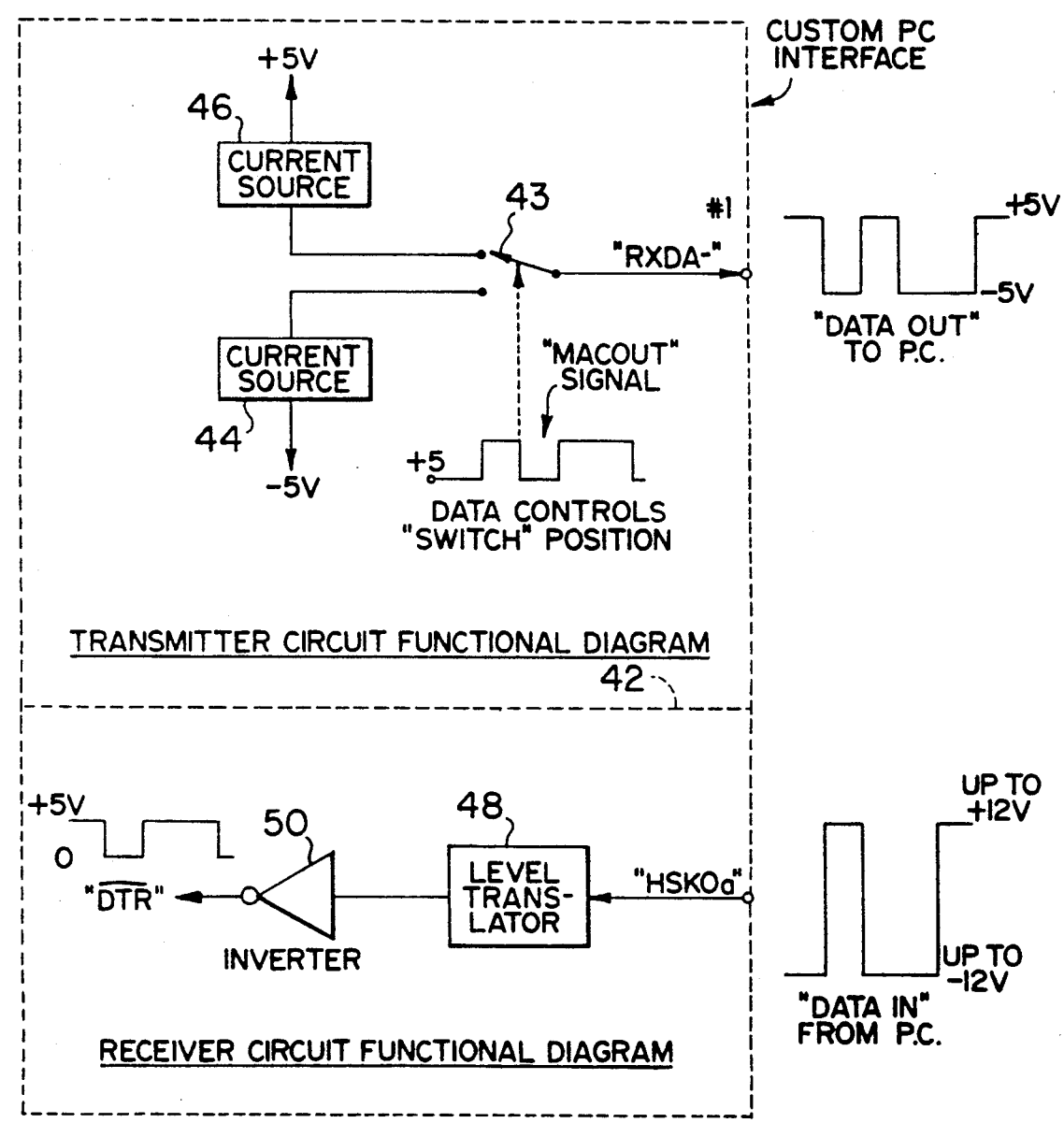
FIG. 3 is a functional block diagram illustrating the operation of a custom line interface circuit forming part of the interface unit of FIG. 2.

FIG. 3 shows conceptually how the custom line interface circuit 30 works. The top half of the figure shows a representation of a transmitter circuit 40 and the bottom half shows a representation of a receiver circuit 42.

The transmitter circuit converts the standard digital data (+5 V for logic "1" and O V for logic "0") into the data levels required by the personal computer (−5 V for a logic "1" and +5 V for a logic "0"). It does this by controlling connection to two current sources by means of an electronic switch 43. When the digital data is +5 V, a current source 44 to the −5 V power rail is switched in. This results in the output line to the personal computer being pulled down to the −5 V level. When the digital data is 0 V, a different current source 46 to the +5 V power rail is switched in. This results in the output line to the personal computer being pulled up to the +5 V level. Since only one current source is on at any one time very little power is used. The conventional way of doing this would be to have the +5 V current source 46 on always but have the −5 V current source 44 stronger and able to overpower the +5 V current source. This results in a waste of power whenever the −5 V current source is turned on.

The receiver circuit converts the data from the personal computer (between −5 V and −12 V for a logic "1" and between +5 V and +12 V for a logic "0"), into standard digital levels required by the data translator 28. (+5 V for logic "1" and 0 V for logic "0"). It does this by a level translator circuit 48 and an inverter circuit 50. The level translator circuit 48 clamps the incoming voltage to +5 V when the signal from the personal computer 16 is between +5 V and +12 V, i.e., for an incoming logic "0". Similarly, the level translator circuit 48 clamps the incoming voltage to 0 V. when the signal from the personal computer is between −5 V and −12 V, i.e., for an incoming logic "1". The inverter circuit 50 then simply inverts the signal (i.e., +5 V output for 0 V input and 0 V output for +5 V input) which completes the receiver function.

Figure 4:
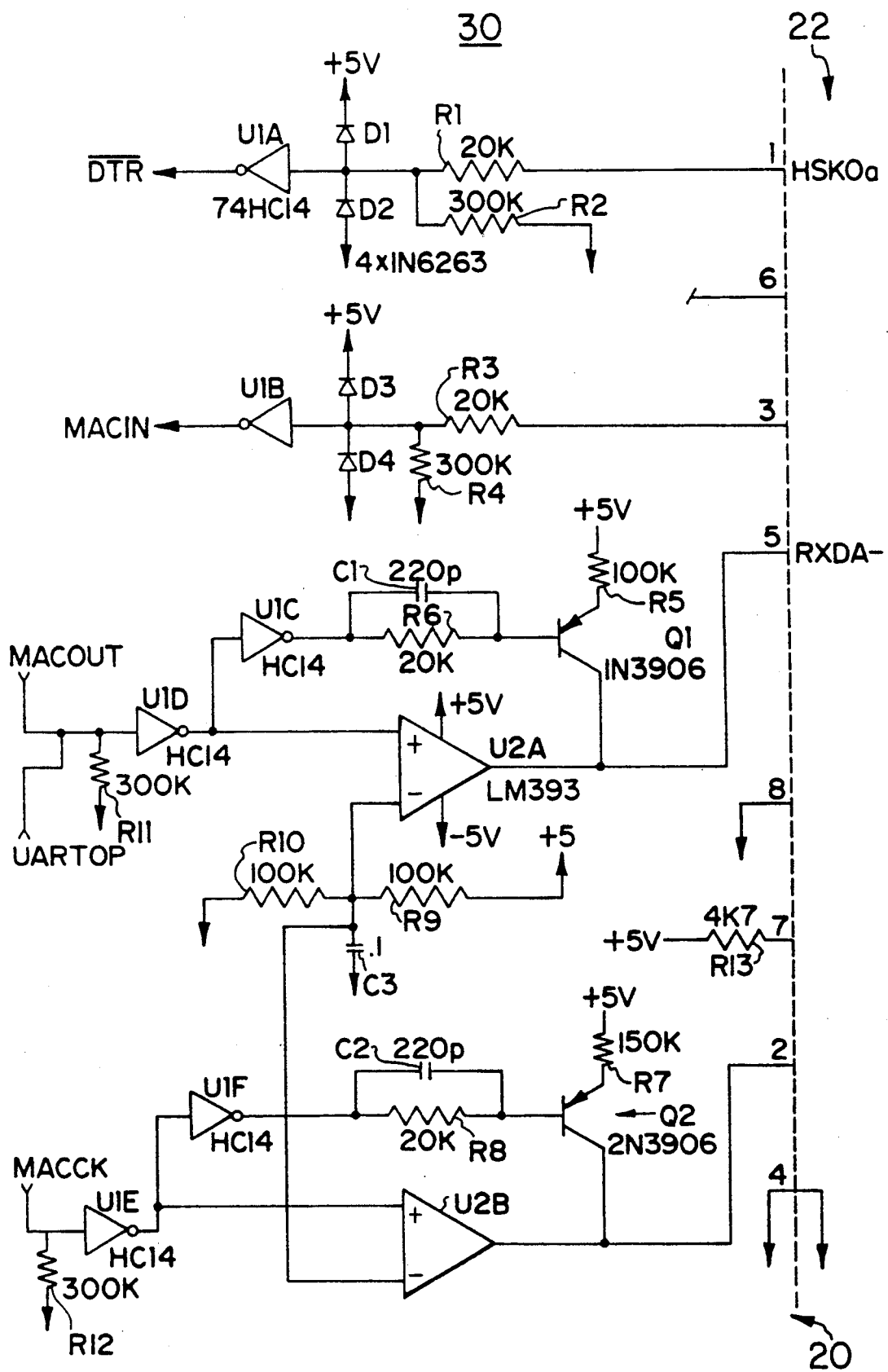
FIG. 4 is a circuit diagram of the custom line interface circuit.

FIG. 4 is a circuit diagram of the custom line interface 30. This comprises essentially the components for two of the transmitter circuits 40 and two of the receiver circuits 42 illustrated conceptually in FIG. 3. Typical values for the resistors and capacitors used in FIG. 4 are indicated.

FIG. 4 illustrates the connections made between the custom line interface 30 and the eight wires of cable 22. These interconnections are established at pins numbered 1-8 formed at an edge of interface unit 20. Specifically, the two transmitter circuits 40 are connected, respectively, to pins 5 and 2 and the two receiver circuits 42 are connected, respectively, to pins 1 and 3. Additionally a +5 V signal is applied through resistor R13 to pin number 7, two signal grounds are connected, respectively, to pins 4 and 8 and pin number 6 is left floating.

One of the transmitters 40 and one of the receivers 42 carries the actual data from or to the twisted pair 8. The other transmitter and receiver are used for "handshaking" signals between the interface unit 20 and the personal computer 16 which can have different functions depending on the application. For example, the personal computer 16 could pull its handshaking signal to a particular logic level to signal that it cannot accept any more data from the interface unit 20. Alternatively the interface unit 20 may pull its handshaking signal to a particular logic level to signal that it cannot accept any more data from the personal computer 16. The exact use of these handshaking signals depends on the application and does not have any direct bearing on the present invention.

One transmitter circuit is formed principally of resistors R5, R6, R11, capacitor C1, transistor Q1, comparator U2A and inverters U1C and U1D. The other transmitter circuit is formed principally of resistors R7, R8, R12, capacitor C2, transistor Q2, comparator U2B and inverters U1E and U2F. Resistors R9, R10 and capacitor C3 are shared between the two transmitter circuits. Only the first transmitter circuit will be described as the configuration and operation of the second is identical.

Resistor R5 connects the emitter of transistor Q1 to a +5 V bias. Inverter U1D has an input to which is supplied the standard digital data signal referred to as "MACOUT" in both FIGS. 3 and 4. Inverter U1C is serially connected to the parallel combination of resistor R6 and capacitor C1, this parallel combination in turn being serially connected to the base of transistor Q1. The input of inverter U1C is connected to the output of inverter U1D.

The output of inverter U1D is also connected to the +input of comparator U2A the output of which is connected to the collector of transistor Q1 from which collector the output signal RXDA− to the personal computer 16 is taken at pin 5. The −input of comparator U2A is connected to the junction of resistors R9, R10 and capacitor C3.

Components R5 and Q1 form the +5 V current source 46. This current source is turned on or off by the digital voltage level at the output of inverter U1C. When the output of inverter U1C is high (+5 V) the current source is turned off when the output of inverter U1C is low (0 V) the current source is turned on. Components R6 and C1 are tailored to control the speed at which the current source is turned on and off.

The −5 V current source 44 is provided by the comparator U2A. When the +input of comparator U2A is at a lower voltage level than the −input the output is connected to −5 V and thus the current source is turned on. When the +input of comparator U2A is at a higher voltage level than the −input the output is floating which means the current source 44 is turned off. The comparator U2A is an "open collector" device meaning its output can only go low (to −5 V in this case) and is otherwise out of the circuit. The components R10 and R9 provide a resistor divider network to place +2.5 V at the −input of U2A. This provides a bias which the digital signal (either 0 V or +5 V) at the +input is compared with. Capacitor C3 is used to filter any noise which might be present on the 2.5 V bias signal.

Overall, the transmitter circuit operates as follows:

When the input signal called "MACOUT" is at a digital "1" (+5 V), the signal at the +input of comparator U2A is 0 V since it was inverted by inverter U1D. Thus the output of comparator U2A is −5 V. As well, the output of inverter U1C is +5 V which turns the +5 V current source 46 consisting of Q1 and R5 off. The output signal to the personal computer at pin 5 is then −5 V.

When the input signal called "MACOUT" is at a digital "0" (0 V), the signal at the +input of comparator U2A is +5 V since it was inverted by inverter U1D. Thus the output of comparator U2A is off and essentially out of the circuit. The output of inverter U1C is then 0 V which turns the current source 46 consisting of Q1 and R5 on. The output signal to the personal computer at pin 5 is then +5 V.

The receiver circuit converts the data from the personal computer (between −5 V and −12 V for a logic "1" and between +5 V and +12 V for a logic "0") into standard digital levels required by the data translator 28. (+5 V for logic "1" and 0 V for logic "0").

One receiver circuit is formed principally of resistors R1, R2, schottkey diodes D1, D2 and inverter U1A, which typically is a CMOS 74HC14 device. The other receiver circuit comprises resistors R3, R4, diodes D3, D4 and inverter I1B. Only the first receiver circuit will be described as the configuration and operation of the second is identical.

The incoming signal from the personal computer is applied to the pin 1 labelled "HSKOa". This voltage is current limited by R1 (20K ohms) and applied to the schottkey diodes D1 and D2. The schottkey diodes clamp the voltage at the input to inverter U1A to a minimum of −0.3 V and a maximum of +5.3 V since the diodes have an on voltage of approximately 0.3 V and are connected to the +5 V and ground supply voltage rails.

Thus when the incoming voltage at the "HSKOa" pin 1 is between +5 V and +12 V (which it will be for an incoming logic "0"), the voltage at the input of inverter U1A will be between +5 V and +5.3 V. This is inverted by inverter U1A and the output signal (labelled "DTR") will be 0 V.

When the incoming voltage at the "HSKOa" pin 1 is between −5 V and −12 V (which it will be for an incoming logic "1"), the voltage at the input of U1A will be approximately −0.3 V. This is inverted by inverter U1A and the output signal (labelled "DTR") will be +5 V.

Resistor R2 (300 K ohms) is provided to ensure that the voltage at the input of inverter U1A does not float when there is no personal computer connection to pin 1. This is necessary since CMOS devices such as the 74HC14 should not have floating inputs or excessive power supply current may be drawn. When no personal computer is connected to pin 1, resistor R2 pulls the input of U1A to 0 V.

Figure 5:
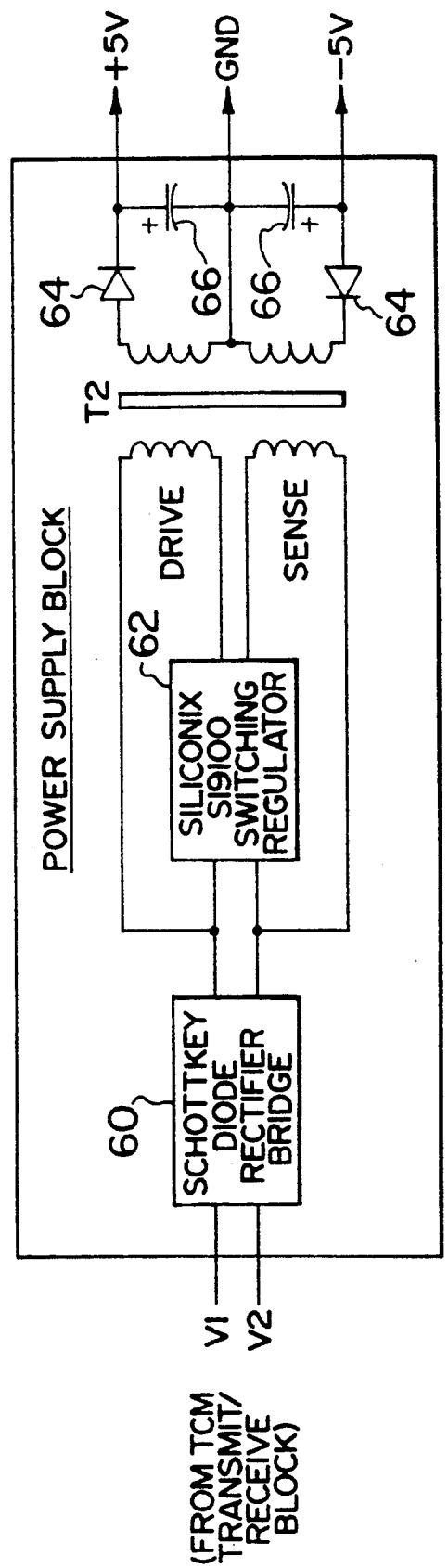
FIG. 5 is a block diagram illustrating in greater detail a power supply block forming part of the circuitry of FIG. 2.

The power supply 24, described with reference to FIG. 2, will now be described in greater detail with reference to FIG. 5.

The power supply block 24 receives power from the Norstar central switch 12 over the 2 wire twisted pair 18 and converts this into +5 V DC and −5 V DC which is required by the other circuitry in the interface unit 20.

The 2 wire twisted pair 18 has a differential voltage of between 10 V DC and 19 V DC on it from the central switch 12. This voltage is rectified by a schottkey diode bridge 60 to ensure the proper polarity of voltage to a switching regulator 62. The switching regulator 62 used is a Siliconix SI9100 device. This device converts the 10 V C to 19 V DC voltage into a pulse width modulated AC signal. This AC signal is applied to a transformer T2 "DRIVE" winding. Transformer T2 is composed of four windings on a common core as shown. One of the transformer windings is the "SENSE" winding. It is used to provide a feedback signal to the switching regulator. By monitoring the sense winding the switching regulator is able to adjust the pulse width modulated "DRIVE" signal accordingly. The "DRIVE" signal is adjusted to maintain the transformer output signals. The output signals from transformer T2 are rectified and filtered by two diodes 64 and two electrolytic capacitors 66 to provide the +5V and −5V DC voltages.

The data transmit/receive block 26 and the data translator block 28, both described with reference to FIG. 2, will now be described in greater detail with reference to FIG. 6.

This block receives and transmits TCM data from the Norstar over the 2 wire twisted pair 18 via a jack 68. The TCM data is in an AC form which is suitable for transmission over a long twisted pair wire.

The TCM data is transformer coupled by transformer T1 and applied to the input pins of a Northern Telecom Custom LSI device 70. (Referred to as "CLSI"). This CLSI device 70 converts the TCM data (half duplex AC format) into standard digital type data. The digital data is characterized by a logic level of +5V for a data "1" and 0V for a data. "0". The standard digital data is presented to the data translator block from the CLSI in a synchronous serial format from a serial interface 72 which is connected to the data translator via four wires which together form the data link 36. The four wires are TX (transmit data from CLSI 70), RX (receive data from data translator block 28), CLK (clock to define when data is valid), and SYN (Synchronization pulse which defined the first bit in the bitstream).

The CLSI 70 has a microprocessor interface 74 through which an external microprocessor in the data translator block 28 is able to monitor and control the operation of the CLSI 70.

The purpose of the data translator block 28 is to transform the serial data from the CLSI 70 to a form which is acceptable to personal computers. Both an asynchronous and synchronous personal computer data format are supported. The asynchronous format is the standard "universal asynchronous receive/transmit" or UART format. The synchronous format is the "high level data link control" or HDLC format. The HDLC format is a clocked data format where the receive and transmit data is synchronized to a clock signal.

The data translator block 28 is composed of a National Semiconductor Corporation HPC46400 microprocessor device 76 plus EPROM 78 and RAM 80 memory. The EPROM memory (electrically programmable read only memory) is used for program storage. The RAM (random access memory) is used for temporary data storage. The HPC 46400 microprocessor 76 has many chip functions which facilitates the movement of data. These functions include a direct memory access (DMA) controller 82, a UART 84, an HDLC controller 86 and a serial interface 88 which is compatible with the Northern Telecom CLSI serial interface.

The DMA controller is used to automatically move data between the serial interface and the external RAM and also between the external RAM and the HDLC controller. In this way, data can be routed between the HDLC port and the serial interface by being temporarily buffered in the RAM. Data can also be moved between the serial interface and the UART by being temporarily buffered in RAM. An input port 90 is also provided and a microprocessor bus 94 which provides interconnection between microprocessor 76 and the interface 74 as well as with the EPROM 78 and the RAM 80.

The UART 84 provides the asynchronous serial data receiver and transmitter function. The UART 84 formats data into a serial word composed of a start bit, 8 data bits and a stop bit. Most personal computers are able to communicate in this asynchronous mode. As shown in the figure, input data to the UART is labelled "MACIN" and output data from the UART is labelled "UARTOP".

The HDLC controller 86 provides the synchronous serial data receiver and transmitter function. The HDLC controller 86 formats data into a serial bit stream with a clock signal to define when data is valid. Many personal computers are able to communicate in this synchronous mode. Referring to the figure, input data to the HDLC controller is labelled "MACIN" and output data from the HDLC controller is labelled "MACOUT". The HDLC controller clock signal is labelled "MACCK".

The signal DTR is a handshake signal. This signal is set either high or low by the personal computer to signify a certain condition. The DTR signal is read by the HP46400 microprocessor 76 via the input port 90.

The interface unit 20 incorporating the novel custom line interface circuit 30 of the present invention is able to operate satisfactorily with very low power consumption at speeds up to 450 Kbits/sec with personal computers operating under RS232, RS422 or RS423 standards for up to 8 feet of cable between the computer and the interface.

The use of a low power LM393 comparator device for the −5V current source also contributes to the low power nature of the transmitter circuit.

Typical industry standard devices (such as Motorola MC1488 devices) have internal transistor circuits which require much more power to operate than the LM393 device.

Another aspect of the low power nature of the device is the receiver circuit. The receiver utilizes a 74HC14 CMOS (complementary metal oxide semiconductor) device for inverter U1A (or U1B). This is a digital CMOS device which has very low power consumption. These digital CMOS devices are not typically employed as line receiver circuits. Typical receiver devices (such as Motorola MC1489 devices) use bipolar transistor circuits which require much more power to operate. The reason digital CMOS devices are not typically used in line receiver circuits such as this one is that the CMOS devices cannot tolerate large voltages at their inputs. This invention however uses diodes and resistors to limit the voltages at the CMOS devices input to an acceptable level. (For example, diodes D1 and D2 and resistor R1 are used for CMOS device U1A in FIG. 4).

I claim:

1. An interface circuit for converting first digital data in which binary "1"s and "0"s are defined by first and second voltage levels respectively into a data signal in which the binary "1"s and "0"s are defined by third and fourth voltage levels, respectively, the interface circuit comprising a first current source deriving a voltage at the third voltage level and a second current source deriving a voltage source at the fourth voltage level and means for connecting the first current source to an output when the digital data is at the first voltage level and for connecting the second current source to the output when the digital data is at the second voltage level.

2. An interface circuit according to claim 1 in which the first voltage level is substantially +5V, the second voltage level is substantially 0V, the third voltage level is substantially −5V and the fourth voltage level is substantially +5V, the first current source including a comparator and inverter connected to the first digital data, the comparator being arranged to derive −5V at its output when the first digital data is +5V and to give no output when the first digital data is 0V, the second current source including a transistor connected to a +5 volt supply and connected also the inverter, the transistor being switched on to derive +5V when the first digital data is at 0V and switched off when the first digital data is +5V.

3. An interface circuit for converting first digital data in which binary "1"s are defined by a first voltage ranging between a first two levels and binary "0"s are defined by a second voltage ranging between a second two levels into a data signal in which the binary "1"s and "0"s are defined by third and fourth voltage levels, the interface circuit comprising a level translator and inverter for setting an output voltage to the third voltage level when the incoming voltage is between the first two levels and for setting the output voltage to the fourth voltage level when the incoming voltage is between the second two levels.

4. An interface circuit for connecting a telephone interface unit in which digital data represented by +5V for logic "1" and 0V for logic "0" is present is present to a personal computer in which logic "1" is represented by at least −5V and logic "0" is represented by at least +5V, the interface unit comprising a transmitter circuit having a first current source connected to +5V and a second current source connected to −5V and means for connecting the first current source to the computer when the digital data is 0V and connecting the second current source to the comparator when the digital data is +5V, the interface unit comprising a receiver circuit for producing an output voltage of +5V when data received from the personal computer is at least −5V and for producing an output voltage of 0V or when data received from the personal computer is at least +5V.

5. An interface circuit according to claim 4 in which the digital data in the interface unit is arranged in a UART format for acceptance by one type of personal computer.

6. An interface unit according to claim 4 in which the digital data in the interface unit is arranged in an HDLC format for acceptance by another type of personal computer.

7. An interface circuit according to claim 4 in which the digital data in the interface unit is arranged selectively in one of a UART format and an HDLC format for acceptance by different types of personal computer.

8. A telephone interface unit for interconnecting a telephone central switch to a personal computer, the interface unit comprising terminal means for connection of a power/data line from the central switch, a power supply powered by the power/data line, means for connecting TCM data on the power/data line to digital data and vice versa, where the digital data is in one of a UART format and an HDLC format with logic "1" represented by +5V and logic "0" represented by 0V and an interface circuit for connecting the interface unit to the personal computer, the interface circuit comprising a transmitter circuit having a first current source connected to +5V and a second current source connected to −5V and means for connecting the first current source to the computer when the digital data is 0V and connecting the second current source to the comparator when the digital data is +5V, the interface unit comprising a receiver circuit for producing an output voltage of +5V when data received from the personal computer is at least −5V and for producing an output voltage of 0V or when data received from the personal computer is at least +5V.

9. An interface unit according to claim 8 in which the TCM data on the power/data line is transferred in a half duplex AC format and the means for converting comprises a data transmit/receive block which converts the TCM data into standard digital data and vice versa, with logic "1" represented by +5V and logic "0" represented by 0V, and a data translator block which transforms the standard digital data from the data transmit/receive block into one of a UART format and an HDLC format and vice versa.

* * * * *